M. C. SHARPNACK.
AIRPLANE.
APPLICATION FILED APR. 17, 1920.
1,388,770.
Patented Aug. 23, 1921.
2 SHEETS—SHEET 2.
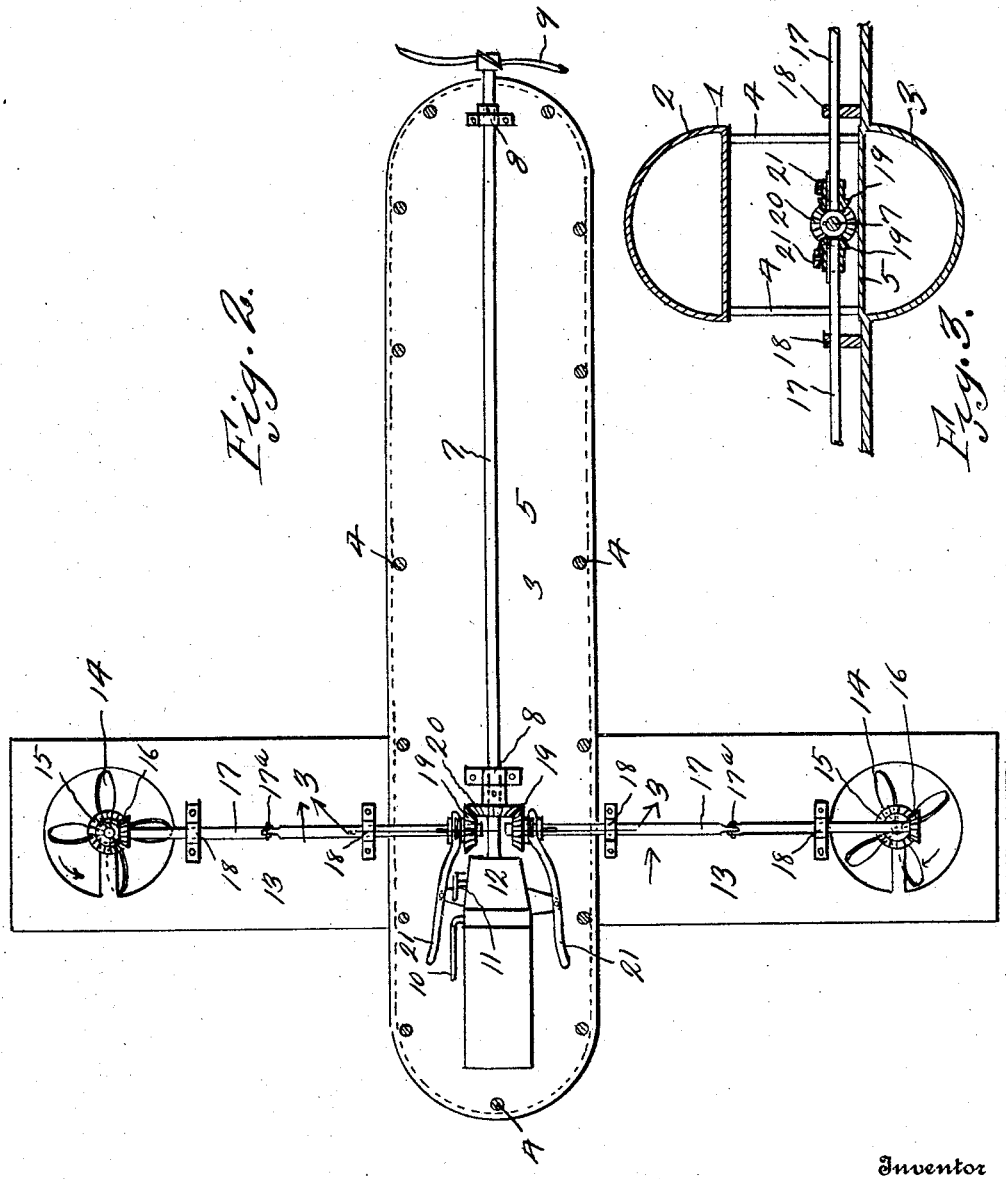
Inventor
M. C. Sharpnack
By Philip A. H. Sentll
1775, Attorney

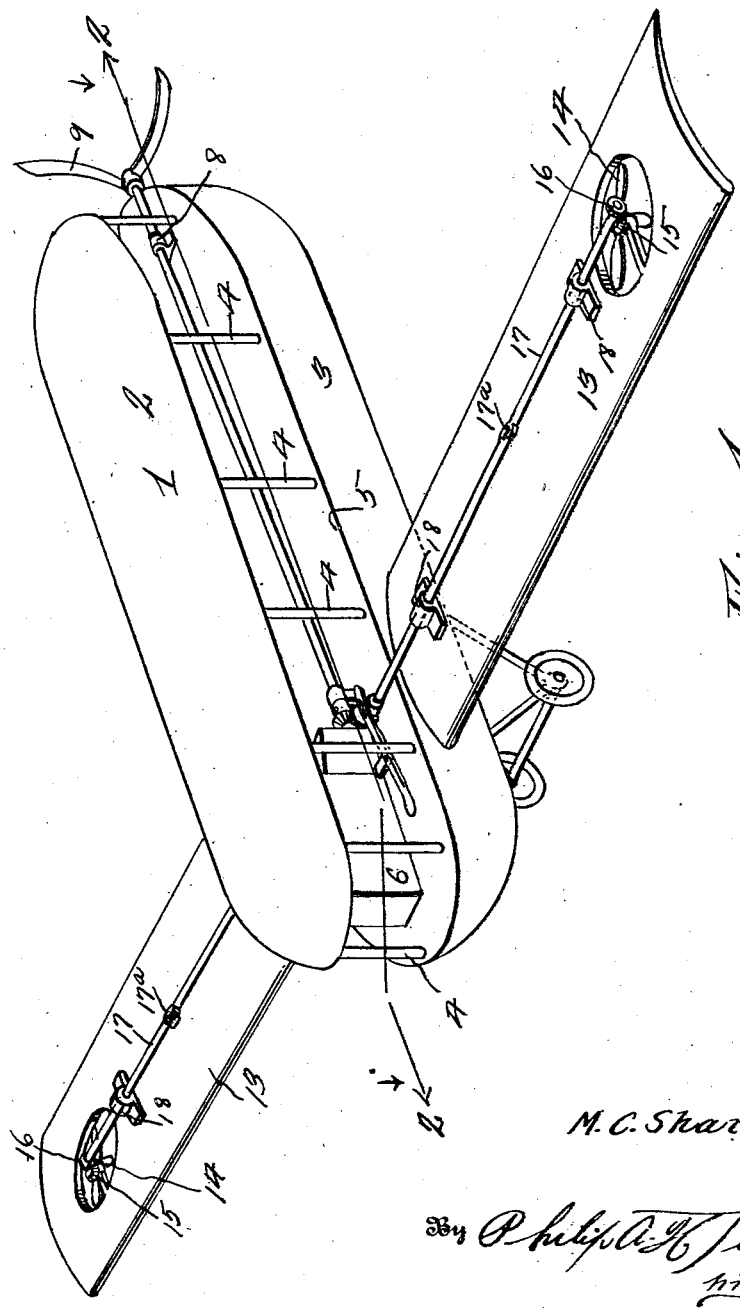

UNITED STATES PATENT OFFICE.

MATTHEW C. SHARPNACK, OF OMAHA, NEBRASKA, ASSIGNOR OF ONE-HALF TO C. L. HIDDLESTON, SR., OF DOUGLAS COUNTY, NEBRASKA.

AIRPLANE.

1,388,770.   Specification of Letters Patent.   Patented Aug. 23, 1921.

Application filed April 17, 1920. Serial No. 374,718.

*To all whom it may concern:*

Be it known that I, MATTHEW C. SHARP-NACK, a citizen of the United States, residing at Omaha, in the county of Douglas and State of Nebraska, have invented certain new and useful Improvements in Airplanes, of which the following is a specification, reference being had therein to the accompanying drawing.

The invention relates to airplanes and has for its object to provide an airplane comprising upper and lower spaced gas containers, formed from sheet metal, preferably aluminum or magnalum, and has for its object to provide outwardly extending wings or planes, which planes are provided with horizontally disposed rotatable propellers whereby the airplane may rise vertically in the air. Also to provide a driving mechanism whereby the air plane as a whole may be driven forwardly and clutch mechanism whereby the horizontally disposed lifting propellers may be rotated simultaneously or independently so that they may be utilized for raising the airplane vertically or as stabilizers for controlling the airplane as a whole.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the airplane.

Fig. 2 is a horizontal sectional view taken on line 2—2 of Fig. 1.

Fig. 3 is a sectional view through the airplane taken on line 3—3 of Fig. 2.

Referring to the drawings, the numeral 1 designates the body of the airplane which body comprises two sections 2 and 3. The sections 2 and 3 are semi-circular in cross section as shown in Fig. 3 and are preferably made of a light material such for instance as aluminum or magnalum. The sections 2 and 3 are adapted to be filled with gas so as to render the same as buoyant as possible. The sections 2 and 3 are held in spaced relation to each other by a series of struts 4, which struts may be of any shape but preferably round to be filled with gas, or streamlined. The upper face 5 of the section 2 has secured thereto in any suitable manner an engine 6, which engine is provided with a rearwardly extending drive shaft 7 which is rotatably mounted in the bearings 8 carried on the upper face 5 of the sections 2, there being a propeller 9 secured to the rear end of the shaft 7 whereby the airplane may be forced forwardly. The shaft 7 is controlled through a clutch lever 10 and a lever 11 which controls any conventional form of variable speed mechanism which is rotated within the casing 12. Thus it will be seen that by operating the clutch the shaft may be driven when desired and driven at various speeds by the manipulation of the lever 11 which controls the variable speed mechanism.

Extending outwardly from the gas chamber 2 are planes 13 in the outer ends of which are rotatably mounted, lifting propellers 14, which lifting propellers 14 are adapted to be rotated for stabilizing the machine as a whole during its flight and also assisting in elevating the machine during flight. The propellers 14 have secured to their shafts bevel gears 15, which bevel gears have meshing therewith bevel gears 16, which are carried by shafts 17 rotatably mounted in bearings 18 of each wing. The shafts 17 are normally not rotated during flight. However, when it is desired to stabilize the airplane during flight one lifting propeller 14 or both if so desired are adapted to be rotated. It is also the intention to utilize the lifting propellers 14 for assisting in lifting the machine as a whole. The inner ends of the shafts 17 have feathered thereon slidable gears 19, which are adapted to be thrown into or out of mesh with the bevel gear 20 when it is desired to rotate the lifting propellers 14. It is to be understood that gears 19 and 20 may be friction gears or any type of transmission mechanism or clutch mechanism may be used at this point. Gears 19 are moved into and out of mesh with the gear 20 by means of levers 21.

From the above it will be seen that a driving mechanism is provided for airplanes, wherein lifting propellers which are rotatably mounted in bearings of the plane and disposed in a horizontal plane may be operated as desired simultaneously or independently, thereby allowing the use of the lifting propellers for stabilizing the machine during flight or if so desired may be used for lifting the machine vertically.

The invention having been set forth what is claimed as new and useful is:

An airplane comprising upper and lower elongated casings semi-circular in cross section, said casings forming gas chambers, the flat surfaces of the casings being inwardly disposed, stanchions connecting the casings together and holding the casings in spaced relation to each other, planes extending outwardly from opposite sides of the lower casing, an engine disposed between the casings and carried by the flat surface of the lower casing, a driving propeller carried by the lower casing and driven by said engine, lifting propellers carried by the planes and means whereby said lifting propellers may be operated independently or simultaneously.

In testimony whereof I hereunto affix my signature.

MATTHEW C. SHARPNACK.